United States Patent
Phillips et al.

(10) Patent No.: US 7,546,471 B2
(45) Date of Patent: Jun. 9, 2009

(54) METHOD AND SYSTEM FOR VIRUS DETECTION USING PATTERN MATCHING TECHNIQUES

(75) Inventors: Thomas G. Phillips, Bellevue, WA (US); Christopher A. Schoppa, Redmond, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 11/036,846

(22) Filed: Jan. 14, 2005

(65) Prior Publication Data

US 2006/0161984 A1 Jul. 20, 2006

(51) Int. Cl.
*G06F 11/30* (2006.01)
*G06F 11/00* (2006.01)
(52) U.S. Cl. .............................. 713/188; 726/24; 726/23
(58) Field of Classification Search .................. 713/188; 726/24, 23
See application file for complete search history.

(56) References Cited

U.S. PATENT DOCUMENTS 6,971,019 B1 * 11/2005 Nachenberg ................. 713/188

OTHER PUBLICATIONS

Microsoft FlexGo Technology Update; Foster, Westerinen; printed out in year 2008.*
Business Week Online Extra: Q & A with Microsoft's Tom Philips; Jun. 21, 2004.*
Chris Schoppa's resume; printed out in year 2008.*
Concept PCs Continue to Shape the Future of Computing, Microsoft; Apr. 24, 2005.*
Microsoft Commits to Hardware and Driver Developer Community; Microsoft; May 5, 2003.*
Microsoft Updates Pay-As-You-Go PC Plan; PC Magazine; May 16, 2007.*
Microsoft Extends Award-Winning Automotive Platform; Microsoft; Jul. 28, 2008.*
Q&A: Athens Prototype PC Inspires Innovations Showcased at WinHEC 2004; May 3, 2004.*
High performance string matching algorithm for a network intrusion prevention system (NIPS) Weinsberg, Y.; Tzur-David, S.; Dolev, D.; Anker, T.; High Performance Switching and Routing, 2006 Workshop on p. 7 pp.*
Improved TCAM-Based Pre-Filtering for Network Intrusion Detection Systems Yeim-Kuan Chang; Ming-Li Tsai; Cheng-Chien Su; Advanced Information Networking and Applications, 2008. AINA 2008. 22nd International Conference on Mar. 25-28, 2008 pp. 985-990.*

(Continued)

*Primary Examiner*—David Y Jung
(74) *Attorney, Agent, or Firm*—Workman Nydegger

(57) ABSTRACT

A method and system for providing virus detection. A virus detection system provides for the use of pattern matching techniques on data at a binary level for virus detection. Whenever an incoming data stream is received, the data stream is segmented into time-based data frames. The time-based data frames are processed to generate associated data frame images utilizing signal processing identification and filter techniques. One or more data frame images are compared to a stored virus image utilizing pattern analysis techniques. A pattern match value associated with each data frame image is generated based on the comparison and a determination is made as to whether or not the pattern match value exceeds a pattern match value threshold. When the pattern match value exceeds the pattern match value threshold, a pattern associated with the virus image is removed from the time-based frames to produce a filtered data stream.

18 Claims, 6 Drawing Sheets

OTHER PUBLICATIONS

A Virus Detection Framework based on SPMOS Tianzhou Chen; Jijun Ma; Nan Zhang; Qingsong Shi; Embedded Software and Systems, 2008. ICESS '08. International Conference on Jul. 29-31, 2008 pp. 610-615.*

* cited by examiner

METHOD AND SYSTEM FOR VIRUS DETECTION USING PATTERN MATCHING TECHNIQUES

FIELD OF THE INVENTION

The invention relates generally to computer systems, and more particularly to an improved method and system of virus detection for a computing device using pattern matching techniques.

BACKGROUND OF THE INVENTION

Computer software applications and systems provide various levels of software virus detection for their users. For example, whenever a new content stream arrives via a web portal, conventional virus protection protocols rely on high level scanning algorithms to scan the payload of the content stream to detect signatures that identify potentially dangerous software components that can be used to compromise the operating environment of network connected computing devices, such as, personal computers (PC's), laptops, network servers, PDA's, cellular phones, and the like.

Typically, these algorithms identify package names and byte lengths of the incoming content stream. However, the algorithms may not identify attack packages within the payload that include hidden names or that include component structures that arrive at the target device in a disassembled state. For example, conventional virus detection software functions at lower levels (e.g. kernel mode) as a filter driver that is implemented into stacks within the operating system level. The virus detection software inspects signatures or scans content on an incoming frame-by frame or block-by-block basis as the data passes through the disk in an attempt to instantiate portions of the data to identify problematic data before the data is written to the disk or is implemented within the operating system. Therefore, these types of virus protection protocols are too high level in their approach and may subsequently miss attack packages that are sufficiently obfuscated. Other conventional virus protection protocols provide byte-stream analysis to cure the above identified deficiencies. Unfortunately, byte-stream analysis via software implementation is computationally intensive thereby potentially creating a performance tax on all network I/O assets. Moreover, byte-stream analysis techniques may not be able to scan encrypted files. Furthermore, such virus detection methods may operate on data that has already been introduced to the computing device's architecture and are unable to check data streams before they have entered the networked devices computing system.

What is desirable is a system and method that provides users with a sufficient level of virus detection without overall system performance degradation.

SUMMARY OF THE INVENTION

Briefly, the present invention provides for the use of pattern matching techniques on data at a binary level for virus detection. To this end, pattern matching techniques are utilized to map out incoming packages and identify portions of the incoming packages that match virus signatures. Examples of pattern matching techniques include signal processing techniques, imaging matching techniques, and the like.

The present invention provides a virus detection system which may include a communication interface, a clock device, at least one processor, and at least one computer readable memory device for providing buffer memory, virus image pattern memory, and random access memory which is readable by the processor which may be introduced as a separate architectural component. Whenever an incoming data stream is received, the data stream is segmented into time-based data frames. The time-based data frames are processed to generate associated data frame images, such as, by utilizing signal processing identification and filter techniques, for example a Fast Fourier Transform (FFT). One or more data frame images are compared to a stored virus image utilizing pattern analysis techniques, such as, color histograms, sum of square differences (SSD), "fingerprinting" via salient features, and the like. A pattern match value associated with each data frame image is generated based on the comparison and a determination is made as to whether or not the pattern match value exceeds a pattern match value threshold. When the pattern match value exceeds the pattern match value threshold, a pattern associated with the virus image is removed from the time-based frames to produce a filtered data stream.

In an embodiment, the virus detection system may be located within a virus detection device interposed between and in communication with a computing device and a communication gateway, such as, for example a wide area network, a local area network, and the like. The virus detection hardware may also be located in another embodiment as part of a motherboard, such as, operably coupled to or within a south bridge chip. The virus detection hardware may additionally be located as part of a central processing unit (CPU).

The virus detection system allows a user to achieve virus protection without a precipitous drop in system performance because the pattern matching techniques may be designed to operate in real-time utilizing signal processing executed by special processor. Moreover, the present invention may be used to screen a data stream and may vector a suspected frame or set of frames for further processing to validate the presence of the virus. The present invention also may be used to detect viruses that have been embedded in encrypted data transmissions. Furthermore, the present invention does not rely on an end user requesting updates to the system nor does it rely on the user to actively activate the system. Other advantages will become apparent from the following detailed description when taken in conjunction with the drawings, in which:

DETAILED DESCRIPTION

Exemplary Operating Environment

Figure 1A:
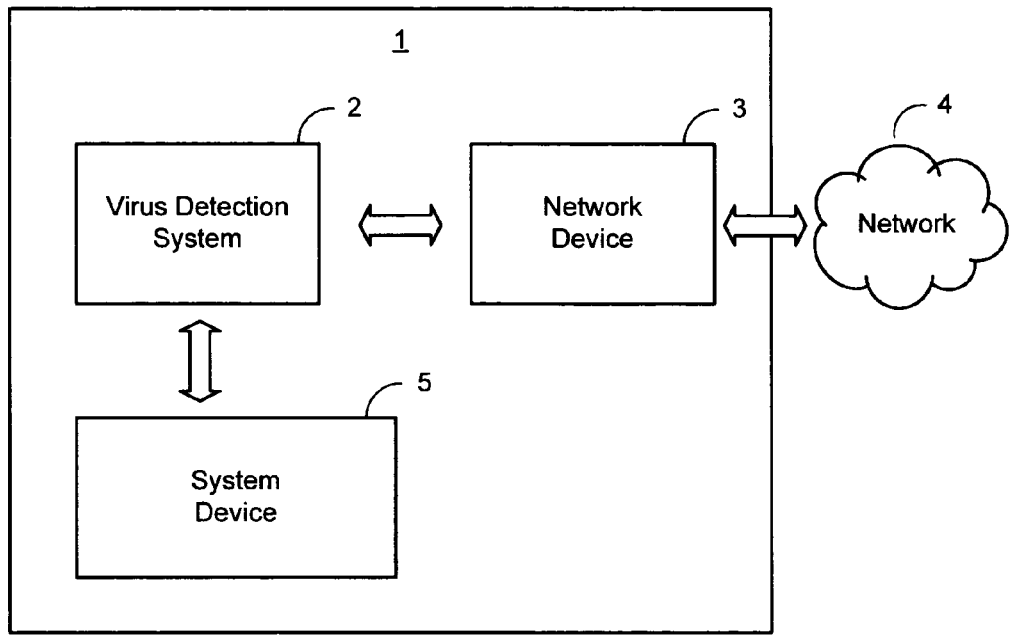
FIGS. 1A-1B are block diagrams representing embodiments of general architectures of systems operative with a virus detection system, in accordance with an aspect of the present invention.
Figure 1B:
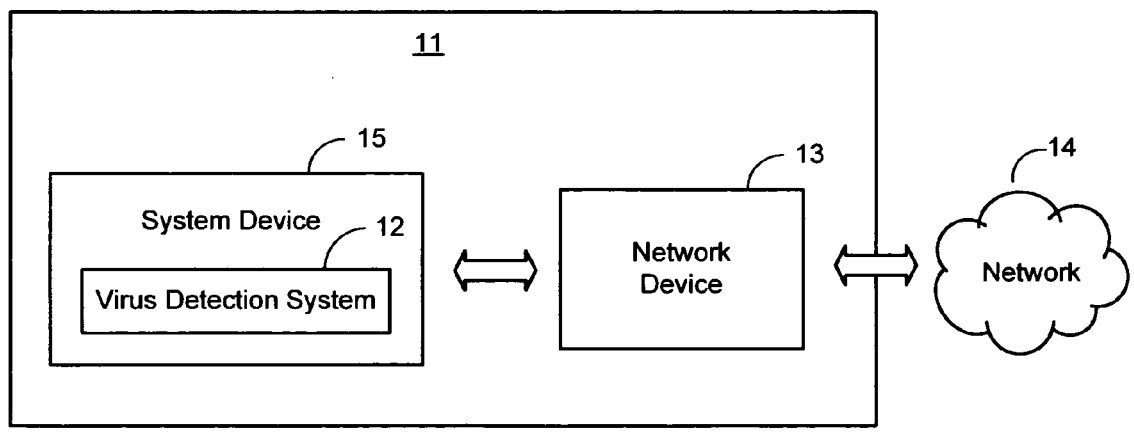
Figure 2:
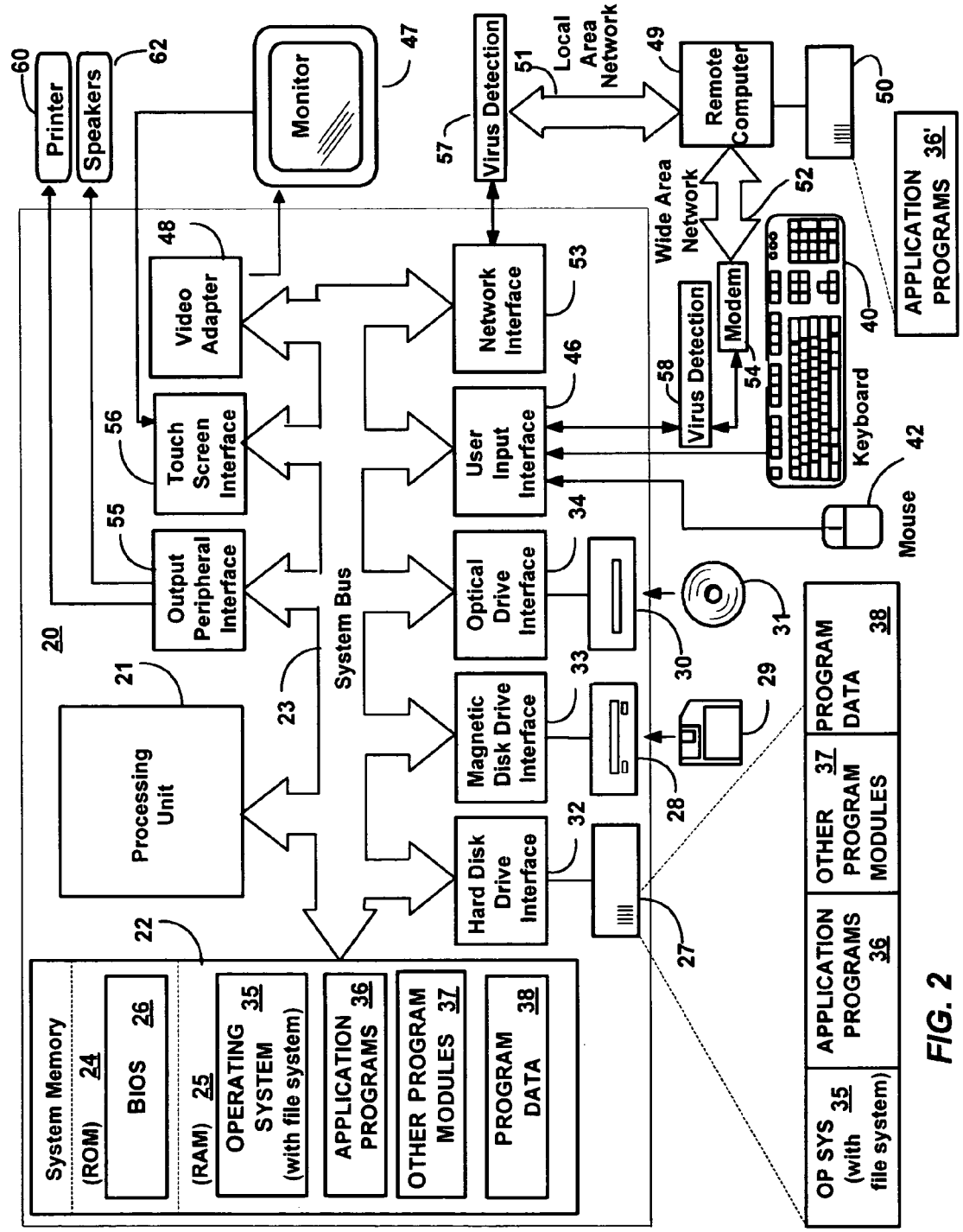
FIG. 2 is a block diagram representing a general purpose computing device in the form of a conventional networked computing system to which the present invention may be incorporated.

FIGS. 1A-2 and the following discussion are intended to provide a general description of various embodiments of suitable computing environments in which the invention may be implemented. FIG. 1A presents a block diagram representing one embodiment of a general architecture of a system 1 operative with the virus detection system of the present invention. As illustrated in FIG. 1A virus detection system 2 may be operably coupled to network device 3 and system device 5 through a serial interface or by other interfaces, such as a parallel port, firewire (IEEE 1394), infrared or wireless connection, universal serial bus (USB) or other peripheral device connection. Network device 3 may be any type of network communications device operably coupled to network 4 for communicating over network 4, for example, to a communications device. Network 4 may be any type of network including local area network (LAN), a wide area network (WAN), enterprise-wide computer networks, intranets and the Internet. Those skilled in the art will appreciate that system 1 may include any number of additional components such as other networked computing devices.

System device 5 may be implemented as any software enabled device, such as, a computing device (detailed in FIG. 2, below), a cellular phone device, and the like. Virus detection system 2 may function to provide various levels of attestation of any data stream communicated between the network device 3 and the system device 5 as well as control the flow of any data stream to and from system device 5 and thereby provide virus protection to system device 5 and other portions of system 1. For example, a web service in one embodiment may provide, cryptographically through a Secure Sockets Layer (SSL) transfer, a HTML payload that notifies the virus detection system of what potentially harmful payloads to detect, such as, infected media access unit (MAU) software, a specific virus, and the like. In the event of an overwhelming attack such as a slammer on system 1, virus detection system 2 may reduce or stop the flow of a data stream to/from system device 5 from any source but a trusted source until virus detection system 2 may be updated and deemed secure. After virus detection system 2 has received any necessary updates, virus detection system 2 may then allow communication from other sources and thereby permit an increase in the data flow of a data stream to system device 5.

FIG. 1B presents a block diagram representing another embodiment of a general architecture of a system 10 operative with a virus detection system, in accordance with an aspect of the present invention. In FIG. 2, system device 15 may be operably coupled to virus detection system 12 which may in turn be operably coupled to network device 13 for communicating with network 14. System device 15, like system device 5 of FIG. 1, may be any type of software enabled device and may be operably coupled to network device 13 through a serial interface or by other interfaces, such as a parallel port, firewire (IEEE 1394), infrared or wireless connection, universal serial bus (USB) or other peripheral device connection. Network device 13 may also be any type of network communications device operably coupled to network 14 for communicating over network 14, for example, to a communications device. Network 14 may also be any type of network including local area network (LAN), a wide area network (WAN), enterprise-wide computer networks, intranets and the Internet. As may be appreciated by those skilled in the art, system 10 may also include any number of additional components such as other networked computing devices.

In FIG. 1B, system 15 may function similarly to system 10 of FIG. 1A, and differs as to the physical location of virus detection system. As FIG. 1B illustrates, virus detection system 12 may be located within system device 15 such as, for example, integrated within a motherboard of system device 15. In one embodiment, virus detection system 12 functions and performs as virus detection system 2 described in FIG. 1A above. Locating virus detection system 12 within system device 15 advantageously allows for manufacturing the virus detection system integrated within any system device, including portable system devices.

FIG. 2 presents a block diagram representing a computing device 20 in the form of a networked computing system with which the present invention may be implemented. Those skilled in the art will appreciate that the present invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, cellular phones, multiprocessor systems, microprocessor-based systems, set top boxes, programmable consumer electronics, network PCs, minicomputers, headless servers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. In a distributed computing environment, program modules may be located in both local and remote memory storage devices. In a distributed computing environment where tasks are performed by remote processing devices linked through a communications network, program modules may be located in both local and remote memory storage devices.

The networked computing system 20 may include a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The networked computing system 20 typically includes a variety of computer-readable media. Computer-readable media can be any available media that can be accessed by the networked computing system 20 and includes both volatile and nonvolatile media, and removable and non-removable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the networked computing system 20. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory may include read-only memory (ROM) 24 and random access memory (RAM) 25. A basic input/output system 26 (BIOS), containing the basic routines that help to transfer information between elements within the networked computing system 20, such as during start-up, may be stored in ROM 24. The networked computing system 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and optical drive interface 34, respectively. The drives and their associated computer-readable media provide non-volatile storage of computer readable instructions, data structures, program modules and other data for the networked computing system 20. Although the exemplary computer system described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 29, optical disk 31, ROM 24 or RAM 25, including an operating system 35 (such as Windows® XP), one or more application programs 36 (such as Microsoft(®) Outlook), other program modules 37 and program data 38. A user may enter commands and information into the networked computing system 20 through input devices such as a keyboard 40 and pointing device 42. Other input devices (not shown) may include a microphone, joystick, game pad, satellite dish, scanner or the like. These and other input devices are often connected to the processing unit 21 through a user input interface 46 that is coupled to the system bus, bus may be connected by other interfaces, such as a parallel port, game port or universal serial bus (USB). A monitor 47 or other type of display device may also be connected to the system bus 23 via an interface, such as a video adapter 48. The monitor 47 may also be integrated with a touch-screen panel or the like and connected to the system bus via touch screen interface 56. Note that the monitor and/or touch screen panel can be physically coupled to a housing in which the networked computing system 20 is incorporated, such as in a tablet-type personal computer. In addition, computers such as networked computing system 20 may also include other peripheral output devices such as speakers 62 and printer 60, which may be connected through an output peripheral interface 55 or the like.

The networked computing system 20 may operate in a networked environment using logical connections to one or more remote computers, such as a remote computer 49. The remote computer 49 may be another personal computer a server, a router, a network PC, a peer device or other common network node, and typically includes many or all of the elements described above relative to the networked computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a WAN networking environment, the networked computing system 20 typically includes a modem 54 or other means for establishing communications over the WAN 52, such as the Internet. The modem 54, which may be internal or external, may be connected to the system bus 23 via the user input interface 46 or other appropriate mechanism. Virus detection device 58 may be interposed between and in communication with a networked computing system 20 and WAN 52. In a networked environment, program modules depicted relative to the networked computing system 20, or portions thereof, may be stored in the remote memory storage device. By way of example, and not limitation, FIG. 2 illustrates remote application programs 36' as residing on memory device 50. It will be appreciated that the network connections shown are exemplary and other means of establishing a communications link between the computers may be used and would include a virus detection device implemented in a similar or alternative embodiment as necessitated by the communications link.

Virus Detection Using Pattern Matching

The present invention is generally directed towards a system and method for virus detection using pattern matching techniques. The virus detection system may be a persistent dynamic network module and may operate to obviate situations where additional computing devices that may be inside an existing security area (e.g. a firewall) within an enterprise system may be infected and capable of infecting the computing network. Additionally, the present invention functions to provide various levels of introspection of network traffic to detect and remove a virus present in any level of the system software, such as, in the lower levels of the system software (e.g. kernel mode), or even in the network stack before it enters the computing system's architecture. Moreover, a user is not required to request updates nor enable the virus detection system for the present invention to operate.

As will be seen, the virus detection system may mitigate polymorphic attacks without undue system degradation and can be utilized in a stand alone implementation or in tandem with existing virus detection and firewall configurations, which may be implemented as either hardware, software, or a combination thereof. As will be understood, the various block diagrams, flow charts and scenarios described herein are only examples, and there are many other scenarios to which the present invention will apply.

Figure 3:
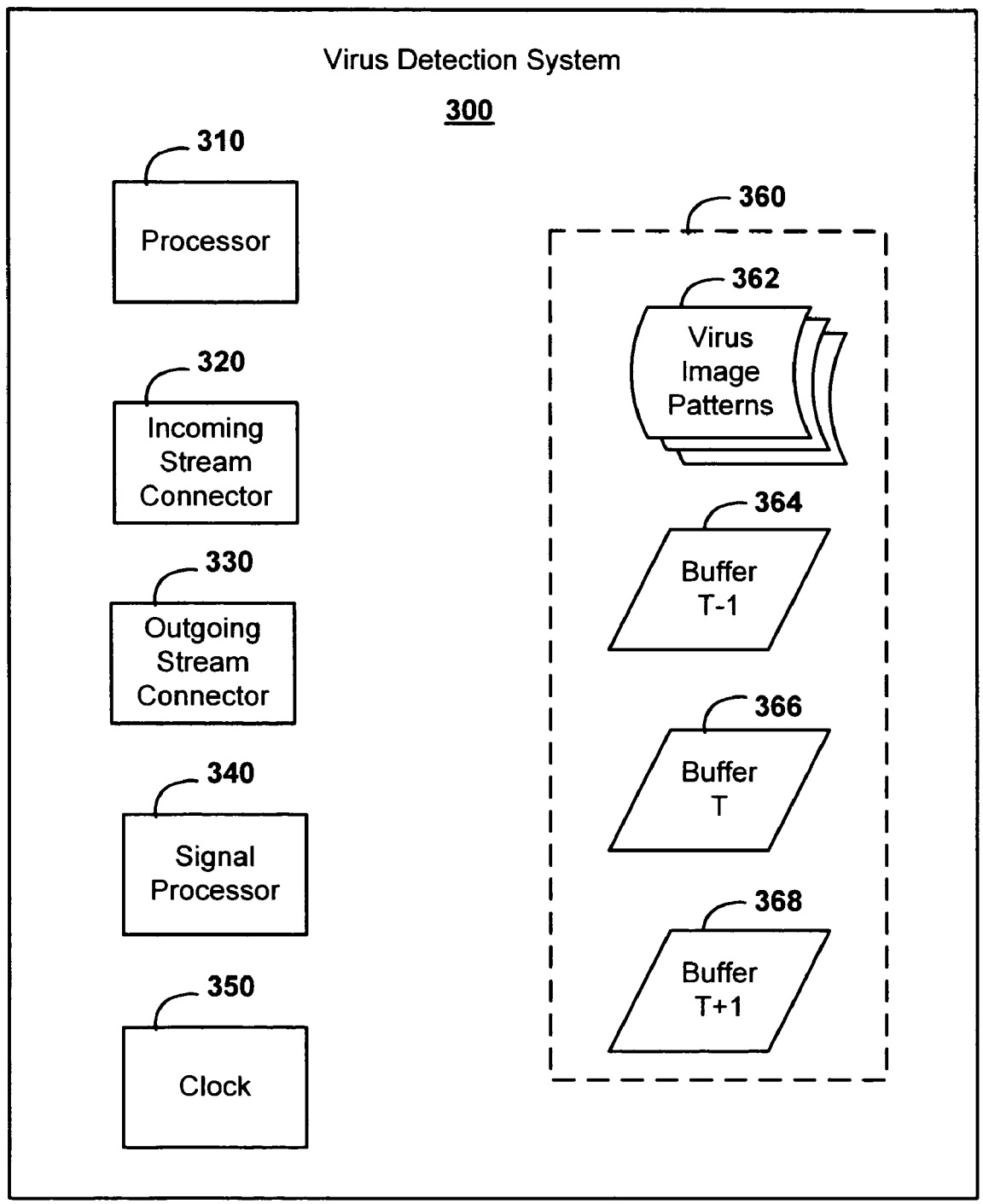
FIG. 3 is a block diagram generally representing an exemplary architecture of system components for virus detection, in accordance with an aspect of the present invention.

Turning to FIG. 3 of the drawings, there is shown a block diagram generally representing an exemplary architecture of system components for virus detection. In FIG. 3, virus detection system 300 may include a processor 310, incoming stream connector 320, outgoing stream connector 330, image/signal processor 340, clock module 350, and memory device 360. Memory device 360 may further include one or more virus image patterns 362 and buffers such as buffer (T−1) 364, buffer (T) 366 and buffer (T+1) 368. Virus detection system 300 may be enabled for unidirectional or bidirectional communication with various devices over a communication interface, including, for example, a cellular phone, a personal computer or a web server, through incoming stream connector 320 and outgoing stream connector 330.

Processor 310 may be any microprocessor, microcontroller, application-specific integrated circuit (ASIC), or combination of the recited components, configured to execute computer instructions. In one embodiment, processor 310 may include memory for caching data, and performing digital signal processing, such as, for example, image processing algorithms. Examples of microprocessors capable of implementing processor 310 functionality may include an ARM processor, an Intel X86 compatible processor, or any proprietary processors with proprietary instruction sets. These processors could be stand alone or implemented as macros in an ASIC or FPGA.

Incoming stream connector 320 and outgoing stream connector 330 may be communication ports that include one or more communication interfaces configured to provide signal and data input and output. As used herein, a data stream means data input and output through one or more communication interfaces. In one embodiment, stream connectors 320 and 330 include interfaces such as, for example, a telephone modem, a wireless access point communicating using one or more protocols, such as IEEE 802.11 and "Bluetooth" protocols, a network interface card, a direct cable interface such as PCI or EIO, a Universal Serial Bus card (USB), an optical port operating in the ultra-violet or infra-red range, and the like.

Clock module 350 may provide periodic signals for the timing and synchronization of one or more digital circuits. In one example clock module 350 clocks image signal processor 340. In another embodiment, clock module 350 and its functionality are incorporated within processor 310.

Memory device 360 may be any volatile or non-volatile computer readable memory, such as, for example, random access memory (RAM), flash memory, and the like. In one embodiment, processor 310 may be configured to execute instructions from one or more programs stored in memory device 360, and to manipulate digital data. For example, memory device 360 may include instructions to execute virus image update logic. Memory device 360 may also include one or more virus image patterns 362 that may be utilized to detect a virus within the data stream. Virus patterns that may be included in virus image patterns 362 may be frequency domain "fingerprints" of a known virus that has been identified and transformed to the frequency domain in order to compare the virus pattern to data in the data stream as part of the virus detection system. In one embodiment, memory device 360 may include flash memory to facilitate the updating of virus image patterns 362. Memory device 360 may also be configured to include one or more buffers, such as buffer (T−1) 364, buffer (T) 366 and buffer (T+1) 368, to receive portions of a data stream. In one embodiment, memory device 360 may include random access memory (RAM) configured to include one or more buffers to receive and store segmented portions of the data stream for virus detection. For example, memory device 360 may be configured to include a single buffer as required by instructions executed by processor 310 or may be configured to include several buffers as required by instructions executed by processor 310.

Signal processor 340 may be any microprocessor, microcontroller, application-specific integrated circuit (ASIC), or combination of the recited components, configured to execute signal processing computer instructions. In one embodiment, signal processor 340 may include memory for caching data, and performing digital signal processing, such as, for example, image processing algorithms. Examples of microprocessors capable of implementing processor 340 functionality include any of the TMS320 DSP's from Texas Instruments, an ADI Blackfin DSP, or the like. In another embodiment, the functionality of signal processor 340 may be incorporated within processor 310 as described above.

In operation, virus detection system 300 may receive a data stream in the form of a time-varying signal composed of a stream of bits and transforms the time-varying signal into the frequency domain for comparison to one or more virus patterns that may also be in a frequency domain format, such s virus image patterns 362 in one embodiment. In one embodiment, signal processor 340 may transform the time-varying signal into a frequency domain signal utilizing well-known mathematical transformations, such as Fast Fourier Transform (FFT), discrete Fourier transform (DFT) which may use a discrete cosine transform (DCT), and the like. The transformed frequency domain signal may then be compared to one or more virus patterns utilizing commercially available pattern matching software, such as, speech pattern matching software (e.g., speech-Markov models), facial recognition software, image recognition software, and the like. The comparison may generate a pattern match value. In one embodiment, if the pattern match value exceeds a pattern match value threshold, then a pattern associated with the virus image may be removed from the data stream thereby producing a filtered data stream. By using threshold for comparison of the pattern match value, varying degrees or confidence levels of matching may be advantageously provided.

Figure 4:
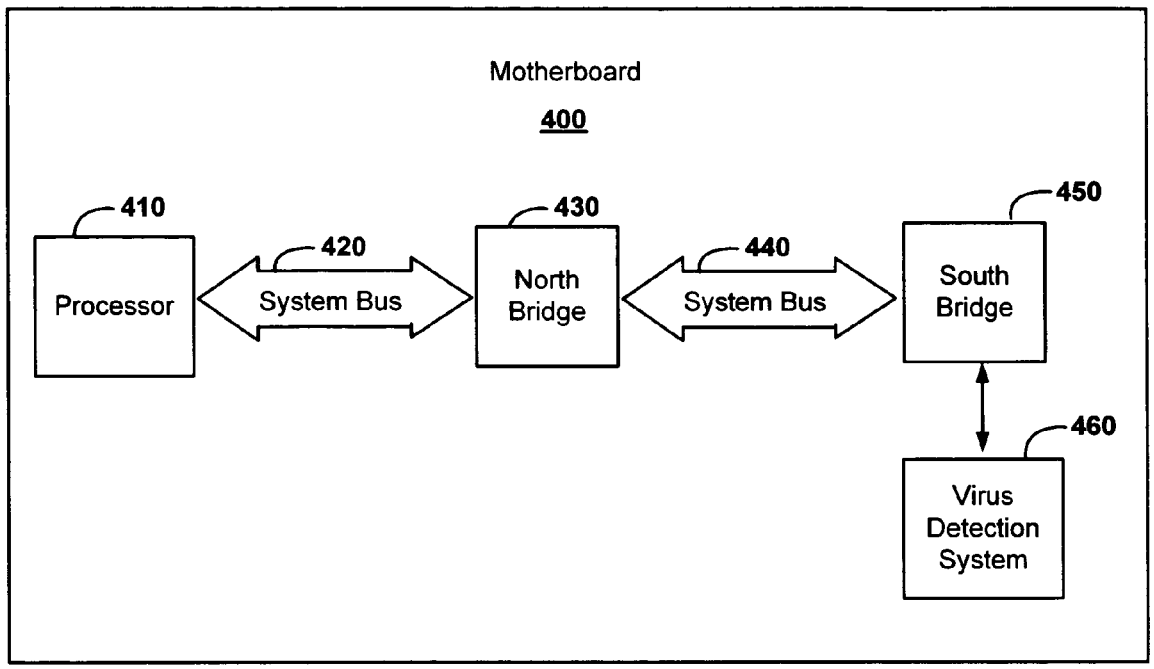
FIGS. 4-5 are exemplary illustrations generally representing locations for placement of the virus detection system on various devices, in accordance with an aspect of the present invention.

FIG. 4 presents an exemplary illustration generally representing an embodiment of the virus detection system incorporated within a motherboard of a computing device. Motherboard 400 illustrated in FIG. 4 may include a processor 410 operably coupled by system bus 420 to north bridge 430. North bridge 430 may, in turn, be operably coupled by system bus 440 to south bridge 450. And south bridge 450 may be operably coupled to virus detection system 460. Those skilled in the art will appreciate that motherboard 400 may include additional components to those shown.

Processor 410 may be any microprocessor, microcontroller, application-specific integrated circuit (ASIC), or combination of the recited components, configured to execute computer instructions. In one embodiment, processor 410 may include memory for caching data, and performing digital signal processing, such as, for example, image processing algorithms. Examples of microprocessors capable of implementing processor 410 include any conventional central processing unit (CPU), such as, an Intel® Pentium® 4 processor, an AMD Opteron™ processor, a Power PC processor, and the like. In one embodiment, processor 410 may be implemented as processing unit 21 of FIG. 2, above.

System buses 420 and 440 may each be any set of conductors, such as, wires or PCB tracks connecting the various functional units in a computing device. For example, system bus 420 may connect processor 410 to external memory and peripheral devices. In one embodiment, system buses 420 may be implemented as a front side bus (FSB) providing communicative connectivity between processing 410 and external memory and peripheral devices. System bus 440 may be configured as a hub-link bus providing communicative connectivity between north bridge 430 and south bridge 450.

North bridge 430 may be an integrated circuit, for example on a microchip, that may be operably coupled by system bus 420 to processor 410 as well as other components on motherboard 400. North bridge 430 may serve to interconnect processor 410, memory (not shown), a video card (AGP) bus (not shown), as well as other chips located on motherboard 400.

South bridge 450 may be an integrated circuit, for example on a microchip, that may be operably coupled by system bus 440 to north bridge 430. South bridge 450 may serve to interconnect plugged-in devices such as network cards or modems to communicate with processor 410 and memory. Thus, south bridge 450 may serve to interconnect additional components that may be plugged into motherboard 400, such as, the IDE controller (not shown), USB controller (not shown), onboard sound (not shown), Ethernet (not shown), and media access controllers (MACs) such as Gigabit Ethernet devices (not shown).

Virus detection system 460 may be operably coupled to and in communication with south bridge 450. Virus detection system 460 may provide the same or similar functionality as virus detection system 400 of FIG. 3 described above. In one embodiment, virus detection system 460 may be implemented by utilizing components described in virus detection system 300 of FIG. 3. For example, virus detection system 460 may be implemented as a microchip that includes the individual components, or a combination of components designed to perform the same functions, as described in virus detection system 300 of FIG. 3. In another embodiment, virus detection system 460 may be implemented as miniaturized components, described in virus detection system 400 of FIG. 3, mounted directly to motherboard 400. In yet another embodiment, virus detection system 460 may be implemented as part of south bridge 450, for example on a chip set that may include the individual components, or a combination of components designed to perform the same functions, described in virus detection system 300 of FIG. 3. Locating virus detection system 460 as part of a system motherboard 400 may eliminate any need for physical installation of one or more components of virus detection system 300 of FIG. 3 after manufacture of motherboard 400.

Figure 5:
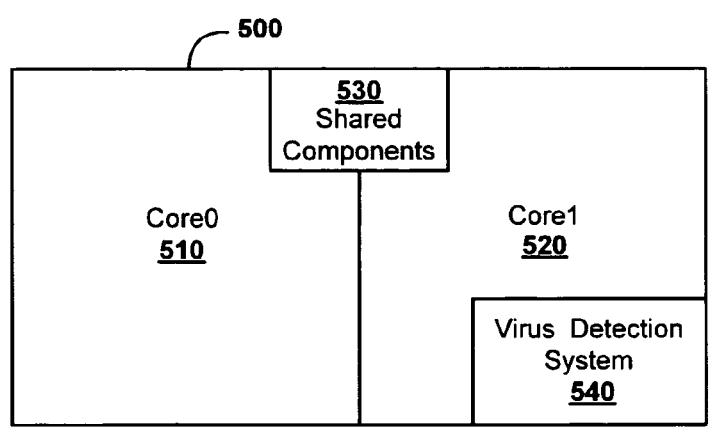

FIG. 5 presents an exemplary illustration generally representing an embodiment of the virus detection system incorporated within a processor of a computing. Processor 500 illustrated in FIG. 5 may include core0 510, core1 520, shared components 530, and virus detection system 540. Each core may include a separate cache as well as programmer-visible data registers, control and status registers, interrupt controller registers, debug registers, segment registers, flags, stack pointers, and model specific registers. Shared components 530 may include a system request queue (SRQ), a crossbar (XBAR), a memory controller (MCT), and a DRAM controller (DCT). Virus detection system 540 represents an area on processor 500 where one or more components of virus detection system 300 described in FIG. 3 may be manufactured. Examples of microprocessors capable of implementing the functionality of processor 500 include an AMD Athlon™ 64, an AMD Opteron™ processor, and the like. Those skilled in the art will appreciate that processor 500 may include additional components to those shown.

Furthermore, processor 500 may be designed using a multi-core architecture that provides for a reduction in latency due to each core including a separate cache that allows different programming instructions to be executed simultaneously. Locating virus detection system 540 within existing silicon of a core allows the virus detection system to operate utilizing core1 520 while allowing core0 510 to continue functioning and processing commands such as system commands. Advantageously, by locating virus detection system 540 within core1 520 may provides enhanced virus protection without substantial reduction in overall system performance of a computing device using processor 500.

Figure 6:
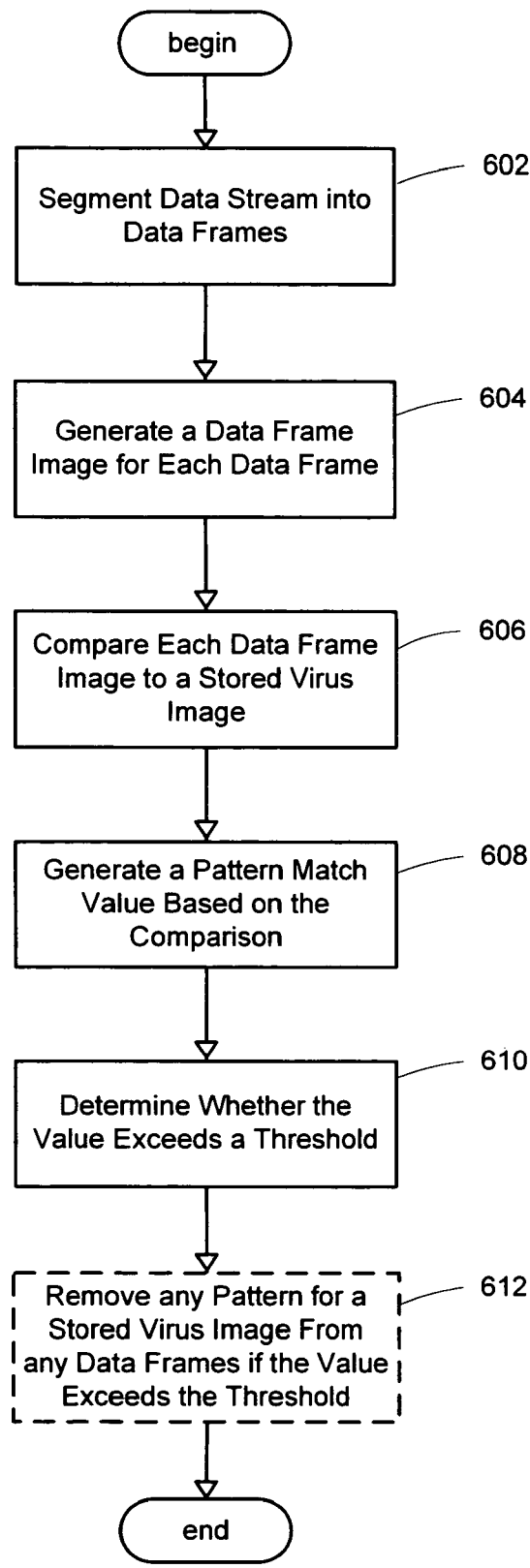
FIG. 6 is a flowchart generally representing the steps undertaken for virus detection and removal, in accordance with an aspect of the present invention.

FIG. 6 presents a flowchart generally representing the steps undertaken for virus detection and removal, in accordance with an aspect of the present invention. In one embodiment, one or more steps of FIG. 6 may be implemented using components of the exemplary virus detection system of FIG. 3. In another embodiment, one or more steps of FIG. 6 may be embodied in a computer readable medium having computer-executable instructions for performing the steps when executed on a computing device.

At step 602, a received data stream may be segmented into data frames. For example, the data stream may be segmented into discrete frames of data, such as fixed size data frames. Alternatively, the data stream may be segmented into time-based data frames, each representing a segment of the data stream received during a specified amount of time. Moreover, the data stream may be a unidirectional data stream received from an unsecured data source, or the data stream may be a bi-directional data stream flowing to and from an unsecured data source. For instance and referring to FIG. 3 above, either processor 310 or signal processor 340 may execute instructions provided by memory 360 to segment an incoming data stream received via incoming stream connector 320 into time-based data frames and to store the time-based data frames at memory device 360.

At step 604, a data frame image may be generated for each data frame. In one embodiment, a data frame image may be generated for a data frame by performing a transform including performing a discrete transform, such as, a discrete Fourier transform (DFT) on at least one data frame. In another embodiment, a data frame image may be generated by performing a Fast Fourier transform (FFT) on at least one time-based data frame. By using the FFT, the virus detection system may view the streaming bits of the data stream as a time varying signal transformed into the frequency domain. In this embodiment, the FFT may produce a frame data image that may be a three dimensional image representing the associated time-based data frame of the received data stream. For example and referring to FIG. 3 above, either processor 310 or signal processor 340 may execute instructions provided by memory 360 to process the time-based data frames and generate associated data frame images by performing a Fast Fourier transform (FFT) on at least one time-based data frame and by storing the data frame images at memory device 360.

At step 606, each data frame image may be compared to one or more stored virus images. In one embodiment, a stored virus image may be a transform of a binary representation of an identified computer virus. For example, the stored virus image may be a transform of an identified computer virus that may provide a "fingerprint" of the virus for comparison to data frame images. In various other embodiments, a data frame image may be compared to a stored virus image using one or more pattern matching techniques, such as histograms, sum of square differences (SSD), "fingerprinting" via salient features, and so forth.

At step 608, a pattern match value may be generated based upon the comparison of a data frame images with a stored virus image. Any number of known techniques may be used to generate a pattern match value, including comparison of the Fourier coefficients. After generating a pattern match value, a determination may be made at step 610 as to whether the generated pattern match value exceeds a threshold. If the pattern match value exceeds a threshold, then the data frame may be considered to be infected with a virus associated with the stored virus image. In one embodiment, the determination as to whether or not the pattern match value may exceed a particular threshold level may be a deterministic process that may include various degrees or levels of confidence that the pattern of the stored virus may be detected in the data frame image. If the pattern match value exceeds the pattern match value threshold, a pattern associated with a stored virus image may be removed from any data frames at optional step 612. As a result, the removal of a pattern associated with the stored virus image may produce a filtered data stream.

Figure 7:
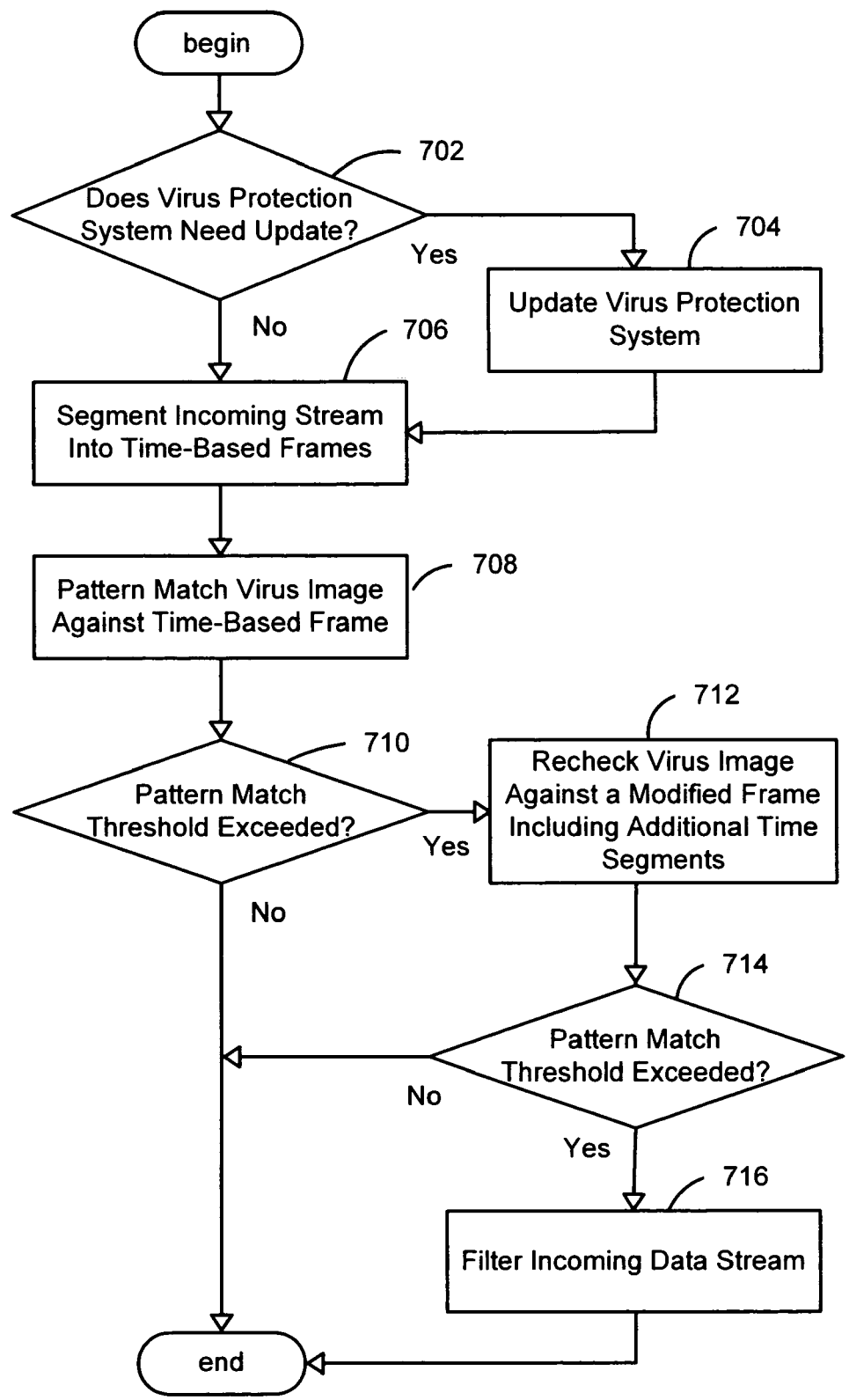
FIG. 7 is a flowchart generally representing the steps undertaken for virus detection and filtering, in accordance with another aspect of the present invention.

FIG. 7 presents a flowchart generally representing the steps undertaken for virus detection and filtering, in accordance with an aspect of the present invention. In one embodiment, one or more steps of FIG. 7 may be implemented using components of the exemplary virus detection system of FIG. 3. In another embodiment, one or more steps of FIG. 7 may be embodied in a computer readable medium having computer-executable instructions for performing the steps when executed on a computing device.

At decision step 702, a determination may be made as to whether the virus detection system needs to be updated. For example, a virus detection system update may be available online for updating the virus detection system. If a virus detection system update may be available, then the virus detection system may be updated at step 704. In one embodiment, the virus detection system update may include a virus signature list having one or more updated virus images and executable instructions for updating the virus detection system. For instance, a virus detection system update may include an XML payload with virus definitions.

After updating the virus detection system at step 704 or if the virus detection system does not need to be updated at step 702, then the incoming data stream may be segmented into time-based data frames at step 706. Each time-based data frame may represent a segment of the data stream received during a specified amount of time. Next, a pattern matching technique may be applied to compare a virus image to a time-based data frame image at step 708. In various embodiments, a data frame image may be compared to a stored virus image using a direct comparison of one or more pattern matching techniques, such as histograms, sum of square differences (SSD), "fingerprinting" via salient features, and so forth.

Once a pattern match of the virus image may be made against a time-based frame, a determination may then be made at decision step 710 as to whether a pattern match threshold has been exceeded. If the pattern match threshold has not been exceeded, then processing may be finished. If the pattern match threshold has been exceeded, the virus image may be rechecked at step 712 against a modified data frame image. In one embodiment, the modified data frame image may include one or more additional time-based frames, such as, the time-based frame preceding (T−1) and/or the time-based frame following (T+1) the original time-based frame (T).

In another embodiment, the virus image may be rechecked against a modified data frame image by comparing one or more data frame images to the stored virus image. For example and referring to FIG. 3 above, signal processor 340 may generate a pattern match value that is associated with comparing a virus image to data frame images T−1, T, and T+1 stored in buffers 364, 366, and 368 respectively. In this example, signal processor 340 may generate the pattern match value based on the comparison of the three data frame images to the virus image.

After the virus image may be rechecked against a modified data frame image, a determination may be made at decision step 714 whether a pattern match threshold has been exceeded. If the pattern match threshold has been exceeded, the incoming data stream may be filtered by removing the virus pattern as described in optional step 612 of FIG. 6. In an alternate embodiment, a suspected frame or set of frames may be vectored for further processing to validate the presence of the virus. If the pattern match threshold has not been reached, then processing may be finished.

As can be seen from the foregoing detailed description, the present invention provides an improved system and method for virus detection using pattern matching techniques on data at a binary level. Any number of signal processing and filter techniques may be employed to identify portions of the incoming data stream that may match virus signatures, including imaging matching techniques, speech recognition pattern matching techniques such as Markov models, facial recognition algorithms, and the like. Moreover, the application of these techniques may be made to any binary sequence already resident on a computing device. Importantly, the present invention may enable detection and removal of viruses before data may be operated on by the computing device and, thus, may provide a further level of protection by insuring that a virus may not have access to resources of the runtime environment of the computing device. The system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing system that includes a virus detection system, a method for detecting a virus, comprising:

receiving a data stream at the virus detection system, wherein the virus detection system includes a signal processor for processing the data stream and memory for storing virus images, wherein the data stream comprises a time-varying signal composed of a stream of bits;

segmenting the data stream into data frames, wherein each frame includes the bits of the time varying signal that were received during a specific time interval;

generating a data frame image for each data frame, wherein each data frame image comprises a transform of the corresponding data frame from the time domain to the frequency domain;

comparing a first data frame image to a first virus image, wherein the first virus image is in the frequency domain;

generating a first pattern match value associated with the first data frame image based on the comparison; and determining whether the generated first pattern match value exceeds a threshold to detect a virus associated with the first virus image such that upon detecting a virus, the data frame corresponding to the first data frame image is removed from the data stream.

2. The method of claim 1 wherein removing the data frame from the data stream further comprises removing a pattern associated with the virus image from the data frame used to generate the first data frame image when the pattern match value exceeds the threshold.

3. The method of claim 1 wherein transforming each data frame from the time domain to the frequency domain comprises performing a Fourier transform on each data frame.

4. The method of claim 3, wherein the Fourier transform is a fast Fourier transform.

5. The method of claim 1, wherein comparing a first data frame image to a first virus image comprises performing a comparison of a plurality of pixels of the first data frame image to a plurality of pixels of the first virus image.

6. The method of claim 1, further comprising:
comparing a plurality of data frame images to the first virus image; and
generating a second pattern match value associated with the data frame images based on the comparison.

7. The method of claim 1, wherein each virus image comprises a transform of a computer virus from the time domain to the frequency domain.

8. The method of claim 1, further comprising comparing a modified data frame image with the first virus image.

9. A computer storage medium having computer-executable instructions for performing the method of claim 1.

10. The method of claim 1, further comprising:
requesting a virus detection system update; and
receiving the virus detection system update.

11. A virus detection system, comprising:
a communication interface;
at least one processor; and
at least one computer readable memory device for providing buffer memory, virus image pattern memory, and random access memory readable by the processor, the computer readable memory device having processor-executable instructions configured to cause the processor to perform the following:
receive a data stream at the virus detection system, wherein the data stream comprises a time-varying signal composed of a stream of bits;
segment the data stream into data frames, wherein each frame includes the bits of the time varying signal that were received during a specific time interval;
generate a data frame image for each data frame, wherein each data frame image comprises a transform of the corresponding data frame from the time domain to the frequency domain;
compare a first data frame image to a first virus image, wherein the first virus image is in the frequency domain;
generate a first pattern match value associated with the first data frame image based on the comparison; and
determine whether the generated first pattern match value exceeds a threshold to detect a virus associated with the first virus image such that upon detecting a virus, the data frame corresponding to the first data frame image is removed from the data stream.

12. The system of claim 11 wherein the virus detection system comprises an ASIC.

13. The system of claim 12 wherein the ASIC communicates with an external computing system and a communication device.

14. The system of claim 11 wherein the virus detection system comprises an ASIC integrated within a CPU motherboard.

15. The system of claim 11 wherein the virus detection system comprises a CPU.

16. The system of claim 11, wherein transforming each data frame from the time domain to the frequency domain comprises performing a Fourier transform on each data frame.

17. The system of claim 16 wherein the Fourier transform comprises a fast Fourier transform.

18. The system of claim 11, wherein comparing a first data frame image to a first virus image comprises comparing the pixels of the first data frame image with the pixels of the first virus image using a pattern matching technique.

* * * * *